(No Model.)
J. B. ARCI & J. CHAPMAN.
STEAM RADIATOR.
No. 320,203. Patented June 16, 1885.
Fig. 1.
Fig. 2.
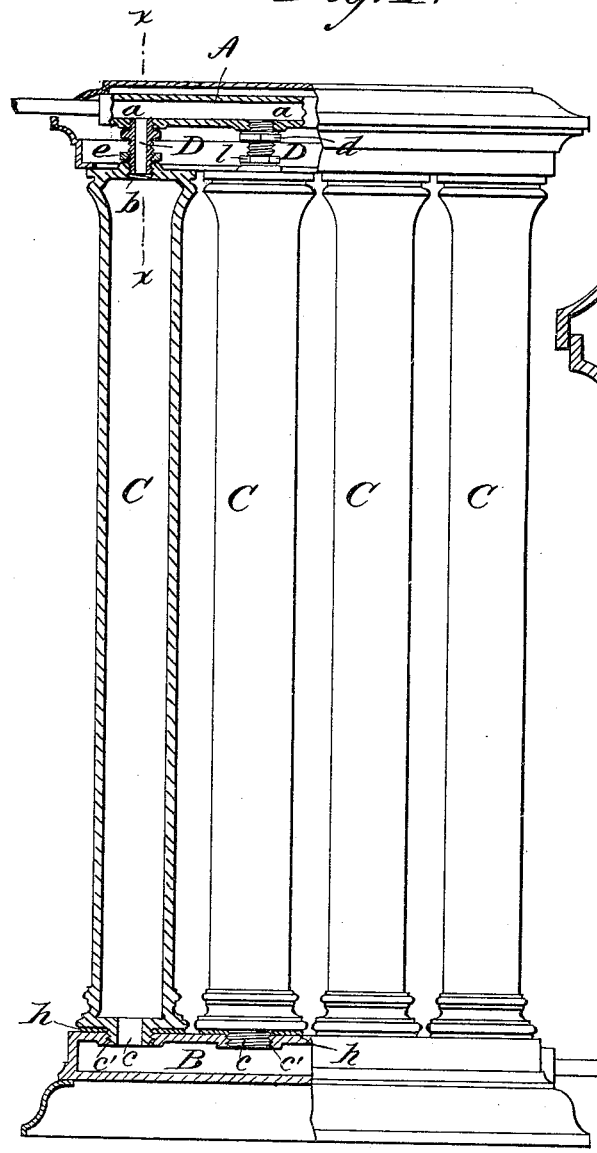
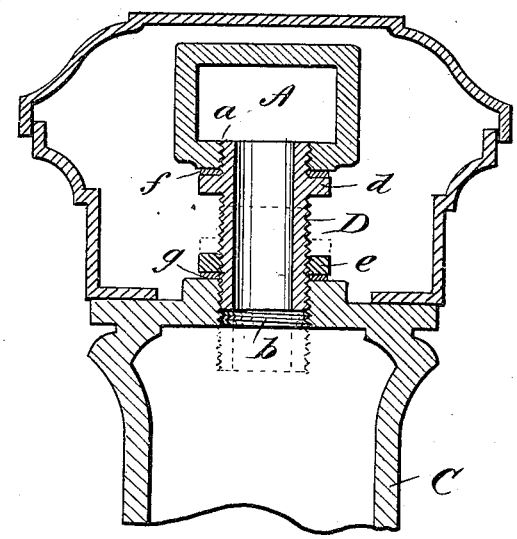
WITNESSES:
Donn Twitchell
C. Sedgwick
INVENTOR:
J. B. Arci
J. Chapman
BY Munn & Co
ATTORNEYS.

United States Patent Office.

JUAN B. ARCI AND JOHN CHAPMAN, OF BROOKLYN, NEW YORK.

STEAM-RADIATOR.

SPECIFICATION forming part of Letters Patent No. 320,203, dated June 16, 1885.

Application filed December 30, 1884. (No model.)

*To all whom it may concern:*

Be it known that we, JUAN B. ARCI and JOHN CHAPMAN, both of Brooklyn, in the county of Kings and State of New York, have invented a new and Improved Steam-Radiator, of which the following is a full, clear, and exact description.

This invention relates to steam-radiators composed of upper and lower steam-chambers with connecting steam-pipes; and the invention consists, principally, in the employment of independent tubes for coupling the steam-pipes to the steam-chambers, whereby any of the pipes may be removed from the radiator without disturbing the other pipes.

The invention also consists of the construction, arrangement, and combination of parts, all as hereinafter described and claimed.

Reference is to be had to the accompanying drawings, forming part of this specification, in which similar letters of reference indicate corresponding parts in both the figures.

Figure 1 is a partly sectional elevation of a radiator made in accordance with our invention, and Fig. 2 is a transverse sectional elevation taken on the line $x\ x$ of Fig. 1.

A represents the upper and B the lower steam-chamber, and C C represent the steam-pipes. The pipes C in this instance are each connected to the lower steam-chamber, B, by a screw-threaded shank, $c$, entering a screw-threaded opening, $c'$, made in the upper wall of the steam-chamber, as shown in Fig. 1. At their upper ends the pipes C are connected with the steam-chamber A by the independent coupling-pipes or short tubes D. These are externally screw-threaded, and enter the screw-threaded openings $b$ of the pipes and the screw-threaded openings $a$ of the chamber A. The tubes D are made somewhat longer than the shanks $c$, so that when any tube D is screwed down into the pipes C, as shown in dotted lines in Fig. 2, sufficient space will be left between the upper end of the tube D and the lower surface of the chamber A to permit the pipe to be unscrewed from the lower steam-chamber, B, and thus removed from and replaced in the radiator without disturbing any of the other pipes. For convenience in turning the tubes D, they are each formed with a many-sided flange, $d$, to which a wrench may be applied. Upon each tube D is placed a jam-nut, $e$, which is screwed down upon the ends of the pipes C to lock the tube and to form steam-tight joints between the tubes and the pipes. If found necessary, soft packing $f\ g$ may be placed upon the coupling-tube D, to form steam-tight joints between the tubes and the steam-chamber A and the steam-pipes C, and upon the shanks $c$, at the lower end of the pipes C, may be placed the packings $h$, to form tight joints at the bottom of the pipes with the lower steam-chamber, B.

Constructed as described the radiator is cheap and practical, and adapted to have any of its pipes C removed and replaced without disturbing the steam-chambers or any of the other pipes in the radiator.

Having thus described our invention, we claim as new and desire to secure by Letters Patent—

The tubes C and the chamber A, screw-threaded at $a\ b$, in combination with the coupling-pipes D, collars $d$, and jam-nuts $e$, the coupling-pipes being externally screw-threaded above and below the collars $d$, and the jam-nuts $e$ screwed upon the coupling-pipes below the collar $d$, substantially as described.

JUAN B. ARCI.
JOHN CHAPMAN.

Witnesses:
F. W. PROSCHER,
JAMES P. ROGERS.